(12) United States Patent
Malcolm

(10) Patent No.: US 8,725,978 B2
(45) Date of Patent: *May 13, 2014

(54) USING SYMBOL INFORMATION FOR CATEGORIZATION OF DYNAMIC MEMORY ALLOCATIONS

(75) Inventor: David Hugh Malcolm, Somerville, MA (US)

(73) Assignee: Red Hat, Inc., Raleigh, NC (US)

(*) Notice: Subject to any disclaimer, the term of this patent is extended or adjusted under 35 U.S.C. 154(b) by 261 days.

This patent is subject to a terminal disclaimer.

(21) Appl. No.: 13/174,646

(22) Filed: Jun. 30, 2011

(65) Prior Publication Data

US 2013/0007400 A1  Jan. 3, 2013

(51) Int. Cl.
*G06F 12/00* (2006.01)

(52) U.S. Cl.
USPC .................. 711/170; 711/151; 711/E12.002

(58) Field of Classification Search
None
See application file for complete search history.

(56) References Cited

U.S. PATENT DOCUMENTS

| | | | | |
|---|---|---|---|---|
| 5,410,701 A * | 4/1995 | Gopalraman | ................ | 717/142 |
| 5,437,025 A * | 7/1995 | Bale et al. | ...................... | 707/103 |
| 5,465,365 A * | 11/1995 | Winterbottom | ............... | 707/101 |
| 5,511,199 A * | 4/1996 | Anthias et al. | ................ | 719/315 |
| 5,623,666 A * | 4/1997 | Pike et al. | .......................... | 707/2 |
| 5,956,512 A * | 9/1999 | Simmons et al. | ............. | 717/128 |
| 6,434,742 B1 * | 8/2002 | Koepele, Jr. | ................... | 717/140 |
| 6,510,352 B1 * | 1/2003 | Badavas et al. | ................. | 700/19 |
| 6,546,553 B1 * | 4/2003 | Hunt | ............................. | 717/174 |
| 6,801,229 B1 * | 10/2004 | Tinkler | ......................... | 715/853 |
| 2002/0129336 A1 * | 9/2002 | Bolding et al. | ............... | 717/124 |
| 2003/0142764 A1 * | 7/2003 | Keevill et al. | ................. | 714/795 |
| 2003/0145281 A1 * | 7/2003 | Thames et al. | ................ | 715/513 |
| 2004/0054945 A1 * | 3/2004 | Smith | ............................ | 714/38 |
| 2004/0128661 A1 * | 7/2004 | Ghosh et al. | ................... | 717/159 |
| 2006/0047501 A1 * | 3/2006 | Seroussi et al. | ................. | 704/9 |
| 2006/0059468 A1 * | 3/2006 | Heirich | ......................... | 717/125 |
| 2006/0072649 A1 * | 4/2006 | Chang et al. | ................... | 375/260 |
| 2006/0080385 A1 * | 4/2006 | Blandford et al. | ............ | 709/203 |
| 2006/0212852 A1 * | 9/2006 | Hwang | ......................... | 717/127 |
| 2007/0067758 A1 * | 3/2007 | Findeisen et al. | ............. | 717/140 |
| 2007/0180192 A1 * | 8/2007 | Matsuda | ....................... | 711/118 |
| 2007/0204259 A1 * | 8/2007 | Wilner et al. | ................. | 717/124 |
| 2007/0234294 A1 * | 10/2007 | Gooding | ....................... | 717/124 |
| 2007/0240124 A1 * | 10/2007 | Taneda et al. | ................. | 717/129 |

(Continued)

OTHER PUBLICATIONS

Richard M. Stallman and Cygnus Support. "Debugging with GDB: The GNU Source-Level Debugger." Ed. 4.12. Jan. 1994.*

(Continued)

*Primary Examiner* — Matthew Bradley
*Assistant Examiner* — Daniel Bernard
(74) *Attorney, Agent, or Firm* — Lowenstein Sandler LLP

(57) ABSTRACT

A programming and debugging system identifies one or more statically-allocated symbols in a symbol table for an inferior process. The statically-allocated symbols pertain to one or more structures for the inferior process. The inferior process has dynamic memory allocations in an inferior process memory space. The symbol table comprises data used to categorize the statically-allocated area of memory. The system locates the structures in the inferior process memory space and determines whether an address of the structures in the inferior process memory space matches an address of a block of the dynamically allocated area of memory. The system categorizes the block of dynamically allocated memory based on the determination of whether an address of the structures matches an address of a block of the dynamically allocated area of memory.

20 Claims, 6 Drawing Sheets

(56) References Cited

U.S. PATENT DOCUMENTS

| | | | |
|---|---|---|---|
| 2008/0071748 A1 | 3/2008 | Wroblewski et al. | |
| 2008/0270996 A1* | 10/2008 | Choi et al. | 717/129 |
| 2008/0273616 A1* | 11/2008 | Papasakellariou | 375/260 |
| 2008/0288919 A1* | 11/2008 | Hodges et al. | 717/106 |
| 2009/0024819 A1 | 1/2009 | Fisher et al. | |
| 2010/0153460 A1* | 6/2010 | Baisley | 707/802 |
| 2010/0153475 A1* | 6/2010 | Zedlitz et al. | 707/814 |
| 2010/0180179 A1 | 7/2010 | Lastras-Montano | |
| 2010/0257054 A1 | 10/2010 | Martin et al. | |
| 2010/0287536 A1* | 11/2010 | Chung et al. | 717/128 |
| 2010/0287538 A1* | 11/2010 | Soundararajan et al. | 717/128 |
| 2011/0252180 A1* | 10/2011 | Hendry et al. | 711/165 |
| 2011/0283163 A1* | 11/2011 | Zheng | 714/763 |
| 2012/0063413 A1* | 3/2012 | Kroener et al. | 370/330 |
| 2012/0216076 A1* | 8/2012 | Macik et al. | 714/38.1 |

OTHER PUBLICATIONS

Graeme S. Roy, "mpatrol, A Library for Controlling and Tracing Dynamic Memory Allocations," Edition 2.17 for mpatrol version 1.5.1, Dec. 19, 2008, 258 pages.

CCMALLOC, as downloaded on Jun. 30, 2011 from http://cs.ecs.baylor.edu/~donahoo/tools/ccmalloc/, 1 page.

Armin Biere, "USAGE," V 1.3, Dec. 4, 2001 as downloaded on Jun. 30, 2011 from http://cs.ecs.baylor.edu/~donahoo/tools/ccmalloc/USAGE , 1 page.

Sanjay Ghemawat, Google Heap Profiler, modified on May 7, 2010, as downloaded on Jun. 30, 2011 from http://google-perftools.googlecode.com/svn/trunk/doc/heapprofile.html , 3 pages.

Mario Hewardt, "Advanced .NET Debugging: Managed Head and Garbage Collection," Nov. 18, 2009, 50 pages.

Klaus Salchner, "SOS from Your Production Environment," Apr. 11, 2005, 12 pages.

SOS.dll (SOS Debugging Extension), as downloaded on Jun. 30, 2011 from http://msdn.microsoft.com/en-us/library/bb190764.aspx, 10 pages.

Karim Yaghmour, Building Embedded Linux Systems, Chapter 11, Section 11.4 Memory Debugging, as downloaded on Jun. 30, 2011 from http://www.eduunix.ccut.edu.cn/index/html/linux/O'Reilly%20-%20Building%20Embedded%20Linux%20Systems/belinuxsys-CHP-11-SECT-4.html, 7 pages.

USPTO Office Action for U.S. Appl. No. 13/174,636 mailed May 13, 2013.

USPTO Office Action for U.S. Appl. No. 13/174,651 mailed Jul. 2, 2013.

Microsoft Corp., "How to use the IIS Debug Diagnosis tool to troubleshoot a memory leak in an IIS process," Microsoft Help and Support, US, Rev. 3.0, Sep. 22, 2006, retrieved Oct. 27, 2006. <http://support.microsoft.com/kb/919790>, 3 pages.

* cited by examiner

USING SYMBOL INFORMATION FOR CATEGORIZATION OF DYNAMIC MEMORY ALLOCATIONS

RELATED APPLICATION

The present application is related to co-filed U.S. patent application Ser. No. 13/174,636 entitled "Debugging a Dynamic Memory Allocation Using Heuristics Reliability Scores" and U.S. patent application Ser. No. 13/174,651 entitled "Using Heuristics for Field Types of a Structure to Categorize Dynamic Memory Allocations", which are assigned to the assignee of the present application.

TECHNICAL FIELD

Embodiments of the present invention relate to debugging memory. Specifically, the embodiments of the present invention relate to categorizing dynamic memory allocations using symbol information.

BACKGROUND

Dynamic memory allocation is the allocation of memory (e.g., random access memory (RAM)) for use in a user program during the run-time of that program. Memory is typically allocated from a large pool of an unused memory area, known in the art as the heap. A user, such as a software programmer, a software developer, and a system administrator, can execute a program and may notice that the program is running at a speed slower than expected and/or that the program is using significantly more dynamically allocated memory than expected. The user may wish to debug how the heap is being used by the program and to help identify how the performance of a program can be optimized.

In cases where a debugging tool has grabbed an allocated block of memory from an inferior process, a traditional solution can use knowledge of statically-allocated data within the inferior process to categorize what an allocated block of memory is being used for in the inferior process. A conventional solution relies on the fact that the debugger grabs an allocated block of memory that has some type of structure. The conventional solution looks at some known point of the grabbed allocated block of memory from an inferior process, perhaps the top of the allocated block of memory, to check whether it is a pointer to a statically-allocated bit of memory, such as a C++ vtable or some kind of type information for a run-time. However, when the debugger grabs an allocated block of memory that does not have any type of structure, the conventional solution is not capable of categorizing the block. For example, the debugger may grab an allocated block of memory from an inferior process that is bitmap data or string data that has a relatively random collection of 1s and 0s with no real structure. In such a case, the conventional solution does not have any structure within allocated block of memory which it can use to categorize the block.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for categorizing dynamically allocated areas of memory by an inferior process using symbol information for a program. A programming and debugging system identifies one or more statically-allocated symbols in a symbol table for an inferior process. The statically-allocated symbols pertain to one or more structures for the inferior process. The inferior process has dynamic memory allocations in an inferior process memory space. The symbol table comprises data used to categorize the statically-allocated area of memory. The system locates the structures in the inferior process memory space and determines whether an address of the structures in the inferior process memory space matches an addresses of a block of the dynamically allocated area of memory. The system categorizes the block of dynamically allocated memory based on the determination of whether an address of the one or more structures matches an address of a block of the dynamically allocated area of memory.

Conventional solutions rely on the fact that a debugger grabs an allocated block of memory that has some type of structure and use that structure to categorize the allocated block of memory. Embodiments can categorize blocks of dynamically allocated memory that do not have structure by using structures and/or pointers to structures in statically-allocated data of symbol information for an inferior process to categorize the allocated blocks of memory.

Figure 1:
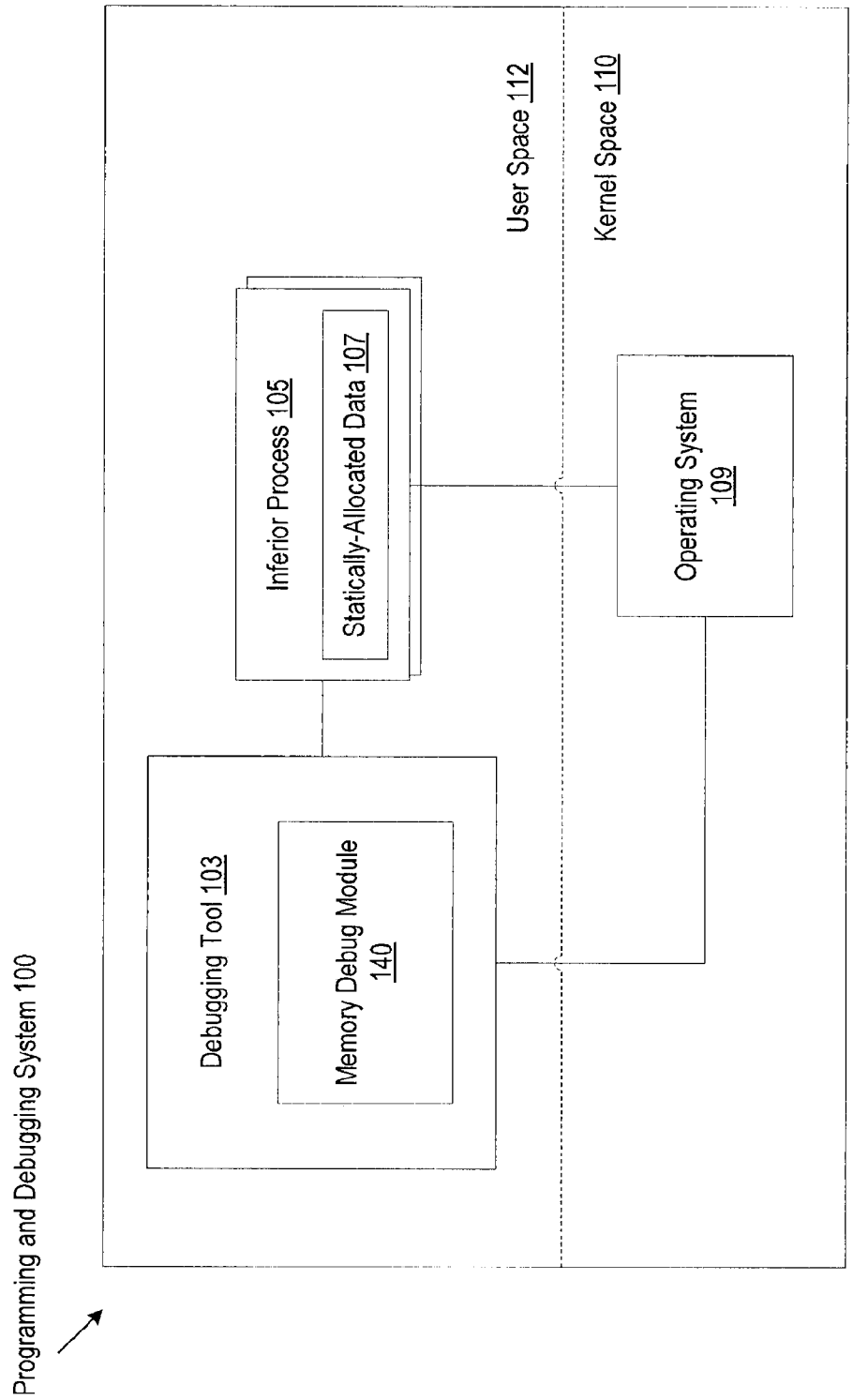
FIG. 1 illustrates an exemplary programming and debugging environment in which embodiments of the present invention may operate.

FIG. 1 illustrates an exemplary programming and debugging system 100 for debugging a dynamic memory allocation using structures and/or pointers to structures in statically-allocated data in accordance with some embodiments of the invention. The programming and debugging system 100 can be hosted by a computer system (e.g., a server, client, workstations, desktop, tablet, one or more small protable platforms, such as a notebook, a PDA (personal digital assistant), or wireless web devices, and other devices. An exemplary computer system is described in greater detail below in conjunction with FIG. 6.

System 100 includes memory that can be divided into regions, such as user space 112 and kernel space 110. The kernel space 110 is reserved for running an operating system 109 (e.g., Linux® OS, Windows® OS, etc.). The user space 112 is reserved for running user mode programs including program processes 105. A program is a set of instructions that can be executed by one or more processors and a program process 105 is an instance of a program that is being executed, with a memory area for its own random-access storage. This is typically implemented using "virtual memory" by an operating system 109, and known as the "address space" of the process 105. A program process 105 is hereinafter referred to as an inferior process. A debugger process is able to take control of an inferior process 109, and, in particular, read the data stored in the memory area of the inferior process 105 into its own memory area.

A user, such as a software programmer, a software developer, a system administrator, can execute a program, which can include execution of one or more inferior processes 105, for example, by using a programming tool. Examples of a programming tool include tools for programming in Java, Perl, Python, Ada, C, C++, FreeBASIC, FreePascal, Fortran, etc. An operating system 109 can statically allocate memory for an inferior process 105 at compile time before the associated inferior process 105 is executed, and can dynamically allocate memory for use in an inferior process 105 during the runtime of that inferior process 105. The memory can be allocated from an area of memory, known in the art as the heap. At program start time, when the operating system 109 statically allocates memory for the inferior process 105, the operating system 109 stores statically-allocated data 107 pertaining to the memory allocated to the inferior process 105 within the inferior process 105 memory space. The statically-allocated data 107 includes references to variables, which can be used by a memory debug module 140 as a starting point to categorize the dynamically allocated areas of memory that are within the inferior process 105 memory space.

The inferior process 105 may be built from more than one compiled object, where the operating system 109 can dynamically link one or more shared objects together with the main executable (sometimes called either Dynamically-Linked Libraries, or DLLs, or Dynamic Shared Objects, or DSOs). In this scenario, the inferior process 105 contains statically-allocated data 107 from all of the components linked within it, and the memory debug module 140 can use any or all of these statically-allocated data 107 as starting points for categorizing the dynamically-allocated memory within the inferior process 105.

A memory debug module 140 can be an extension module running with a debugging tool 103. The programming and debugging system 100 hosts a debugging tool 103 in the user space 112 to allow a user to debug the dynamically allocated areas of memory within the inferior process 105. For example, an inferior process 105 may be running and a user may notice that the inferior process 105 is executing at a speed slower than expected and/or that the inferior process 105 is using significantly more dynamically allocated memory than expected. The user can execute the debugging tool 103 to categorize the dynamically allocated areas of memory within the inferior process 105 and identify how the performance of a program executing the inferior process 105 can be optimized. An example of a debugging tool 103 is the GNU Debugger (GDB) for the GNU operating system. The kernel space 110 can include a kernel source level debugger (not shown), such as KGDB for the Linux® operating system, which allows for debugging of the host Linux® kernel through GDB.

Unlike conventional solutions, the memory debug module 140 can debug an allocated block of memory that does not have any type of structure by using structures and/or pointers to structures in statically-allocated data 107 of symbol information for an inferior process 105. The memory debug module 140 can determine whether any of the addresses of the blocks of dynamically allocated memory match an address of any structure and/or pointers to structures. When there is a match, the memory debug module 140 can categorize the particular block of memory as an instance of the structure.

An external debugger process can read in collections of bytes from the inferior process 105 and determine the best interpretation of each of the collections of bytes. Given a buffer of bytes from the inferior process 105 and a set of different possible interpretations, the memory debug module 140 can determine which of the interpretations are valid interpretations of the bytes. The memory debug module 140 can use structures and/or pointers to structures in statically-allocated data 107 of symbol information for an inferior process 105 to determine which of the interpretations is the best interpretation and categorize the allocations of the bytes from the inferior process.

The debugging tool 103 can attach to the inferior process 105 and execute an external debugger process, which is a process that is separate from the inferior process 105 and has a debugger process memory space that is separate from the inferior process 105 memory space. Using an external debugger process that is separate from the inferior process 105 allows a user to debug the dynamic memory allocation without having to reconfigure a programming and debugging system 100 ahead of time.

Figure 2:
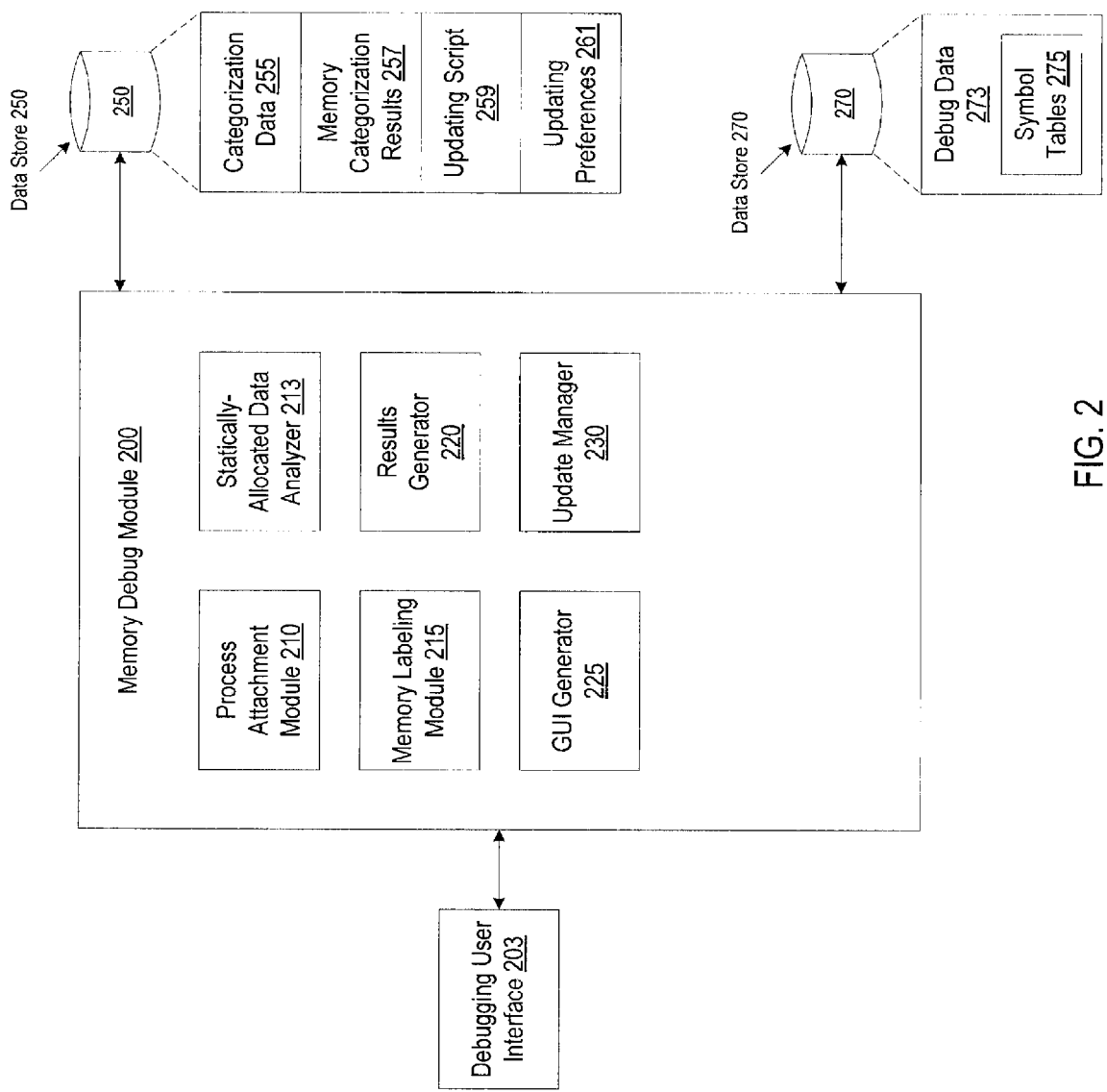
FIG. 2 is a block diagram of one embodiment of memory debug module for debugging a dynamic memory allocation using structures and/or pointers to structures in statically-allocated data.

FIG. 2 is a block diagram of one embodiment of a memory debug module 200 for debugging a dynamic memory allocation using structures and/or pointers to structures in statically-allocated data of symbol information for an inferior process. The memory debug module 200 may be the same as the memory debug module 140 in the system 100 of FIG. 1. The memory debug module 200 includes a process attachment module 210, a statically-allocated data analyzer 213, a memory labeling module 215, a results generator 220, graphical user interface (GUI) generator 225, and an update manager 230.

A user can execute a debugging tool, such as GDB (GNU Debugger), to debug dynamic memory allocations. The process attachment module 210 can identify a process ID of an inferior process and can use the process ID to attach the debugging tool to the inferior process, which invokes an external debugger process to debug the dynamically allocated memory that is within the inferior process memory space. The process ID may also be supplied directly by user input. For example, the user may run a program named "top" to see the most memory-consuming processes on the system, notice something he/she was not expecting, and identify the process ID from that program's textual output. An operating system can provide system calls which the process attachment module 210 can use to directly access the address space of the inferior process, and read and write bytes of memory in the address space of the inferior process.

In one embodiment, the memory debug module 200 is coupled to a data store 270 that stores symbol data, such as symbol tables 275 within debug data 273. The debug data 273 may be generated by a compiler program, which compiled the program software, and typically, is stored in debug data files in one or more data stores 270. One example of storing debug data can include, and is not limited to, storing debug data in a DWARF data format. The debug data 273 can include metadata that provides a description of the in-memory layout of the data types used by the inferior process. Some of these types are simple in nature, corresponding to machine code types. For example, the debug data 273 may record that the type "Py_Unicode" is an unsigned integer type occupying 4 bytes. Other types may be compound in nature. For example, the debug data 273 may record that there is a type "struct PyUnicodeObject", and that it has 7 fields, along with the name, type, and relative location of each field. Some of these fields will themselves be simple types, others compound. Typically, many of the types will be pointers to other types, implying a graph of cross-references within the inferior processes' data.

The statically-allocated data analyzer 213 can use debug metadata in debug data 273 to identify pointers to structures and/or structures in the statically-allocated data (e.g., statically-allocated data 107 in FIG. 1) for the inferior process. At program start, when the operating system statically allocates memory for an inferior process, the operating system stores statically-allocated data pertaining to the memory allocated to the inferior process. The statically-allocated data analyzer 213 can use references to variables in the statically-allocated data to search a symbol table 275 of the inferior process for these variables. A symbol table 275 is a listing of all of the symbols, along with their memory addresses, for the various dynamic libraries and binaries that form an inferior process. A symbol table 275 includes data that identifies global symbols and local symbols. A symbol table 275 can include an entry for each symbol that includes a field that provides a classification of the symbol's type. For example, the 'type' information can classify a symbol as having no type, a function type, a section type, an object type, etc. The statically-allocated data analyzer 213 can examine the 'type' information in the entries for the statically-allocated symbols in the symbol table 275 and can locate the symbols that have an 'object type' and identify these symbols as pertaining to structures and/or pointers to structures.

The statically-allocated data analyzer 213 can determine an address of a structure and/or a pointer to a structure in the statically-allocated data by querying the structure and/or a pointer to a structure in the memory of the inferior process to receive a value back from the inferior process of what the current address value of that structure and/or pointer to structure is.

The memory labeling module 215 can then examine the addresses of the dynamically-allocated blocks of memory to determine whether any of these addresses matches that of the address value of the structure and/or pointer to structure that was returned from the query. When there is a match, the memory labeling module 215 can identify the type of the dynamically-allocated block of memory based on the match and categorize the block of memory as an instance of the structure. When there is not an address match, the statically-allocated data analyzer 213 can categorize a block of dynamically allocated memory as 'uncategorized', 'unknown', etc.

For example, the statically-allocated data analyzer 213 uses the references to variables in the statically-allocated data and locates the statically-allocated symbols for these variables in the symbol information of the inferior process. The statically-allocated data analyzer 213 examines the 'type' information of the statically-allocated symbols and identifies that a statically-allocated symbol relates to a structure 'struct Foo'. For example, a C program might read: struct Foo*ptr_to_foo, where 'ptr_to_foo' is a statically-allocated pointer. The statically-allocated data analyzer 213 locates the ptr_to_foo (as it is statically-allocated), reads its value 0x32781020 from the memory of the inferior process, and determines that the address of a structure struct Foo in the inferior process memory space is at the address 0x32781020. The memory labeling module 215 determines that the address of a block of dynamically allocated memory matches the address 0x32781020 of struct Foo and categorizes this particular block of dynamically allocated memory as being an instance of the structure struct Foo.

Unlike conventional solutions which may rely on on the fact that the debugger grabs an allocated block of memory that has some type of structure, the memory debug module 200 can use a structure and/or a pointer in statically-allocated data within an inferior process to categorize an allocated block of memory from an inferior process. For example, when a debugger grabs actual bytes within a block of dynamically allocated memory from an inferior process that do not have any structure within them, such as bitmap data that may have a relatively random collection of 1s and 0s with no real structure, the statically-allocated data analyzer 213 can detect a pointer to a structure in the statically-allocated data within the inferior process and query the pointer to obtain an address value for the pointer in the memory of the inferior process. The memory labeling module 215 can compare the addresses of the dynamically-allocated blocks of memory to the address value of the pointer to determine whether there is a match for identifying what the 1s and 0s in the bitmap data are being used for.

The memory labeling module 215 can continue to iterate through the blocks of dynamically allocated memory (e.g., RAM) that is of interest within the inferior process memory space and determine whether any of the addresses of the blocks of dynamically allocated memory match any of the addresses of the structures that are referenced by the statically-allocated data.

In another embodiment, the memory debug module 200 can use any combination of statically-allocated data, symbol data, and heuristics data to categorize the dynamically allocated areas of memory within the inferior process memory space. For example, the memory debug module 200 can use statically-allocated data and symbol tables to first categorize a block of memory within the inferior process memory space as being referenced by statically-allocated data. The memory debug module 200 can then apply one or more criteria in heuristics data that corresponds to the inferior process to further subcategorize the bytes of memory within the block of memory that is referenced by statically-allocated data.

The memory labeling module 215 can generate categorization data 255 for the blocks of dynamically allocated memory and can store the categorization data 255 in the data store 250. The categorization data 255 can be stored within the debugger process memory space. The categorization data 255 can include the address of the dynamically allocated memory and a category that is assigned to the block of memory.

The results generator 220 can generate memory categorization results 257 based on the categorization data 255 for the dynamically allocated memory. Examples of memory categorization results 257 include backtraces, snapshots of the state of the program process dynamic memory, a history of the snapshots, data showing the differences between the states, data that identifies buffer overflow, etc. The results generator 220 can receive user input, via a debugging user interface 203 that is coupled to the memory debug module 200, that identifies which memory categorization results 257 to generate. The debugging user interface 203 can be a graphical user interface. The graphical user interface (GUI) generator 225 can generate a GUI displaying the memory categorization results 257 to a user via the debugging user interface 203. The memory categorization results 257 can be stored in the data store 250. The memory categorization results 257 can be stored within the debugger process memory space, unlike traditional solutions that store data, such as backtraces, within the program process memory space.

In one embodiment, the results generator 220 stores the memory categorization results 257 in a cache that is coupled to the memory debug module 200. The update manager 230 can run an updating script 259 that is stored in the data store 250 to detect when information changes within the inferior process that is attached to a debugging tool and update the memory categorization results 257 to reflect the changes. The update manager 230 can periodically run the updating script 259 based on user input (e.g., every minute until the debugging tool is detached from the program process). The user input can be received via the debugging user interface 203 and can be stored as update preferences 261 in the data store 250.

A data store can be implemented on a main memory or other data storage device, such as disks, network storage, and virtual memory. A data store can be a persistent storage unit. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set', as used herein, refers to any positive whole number of items.

Figure 3:
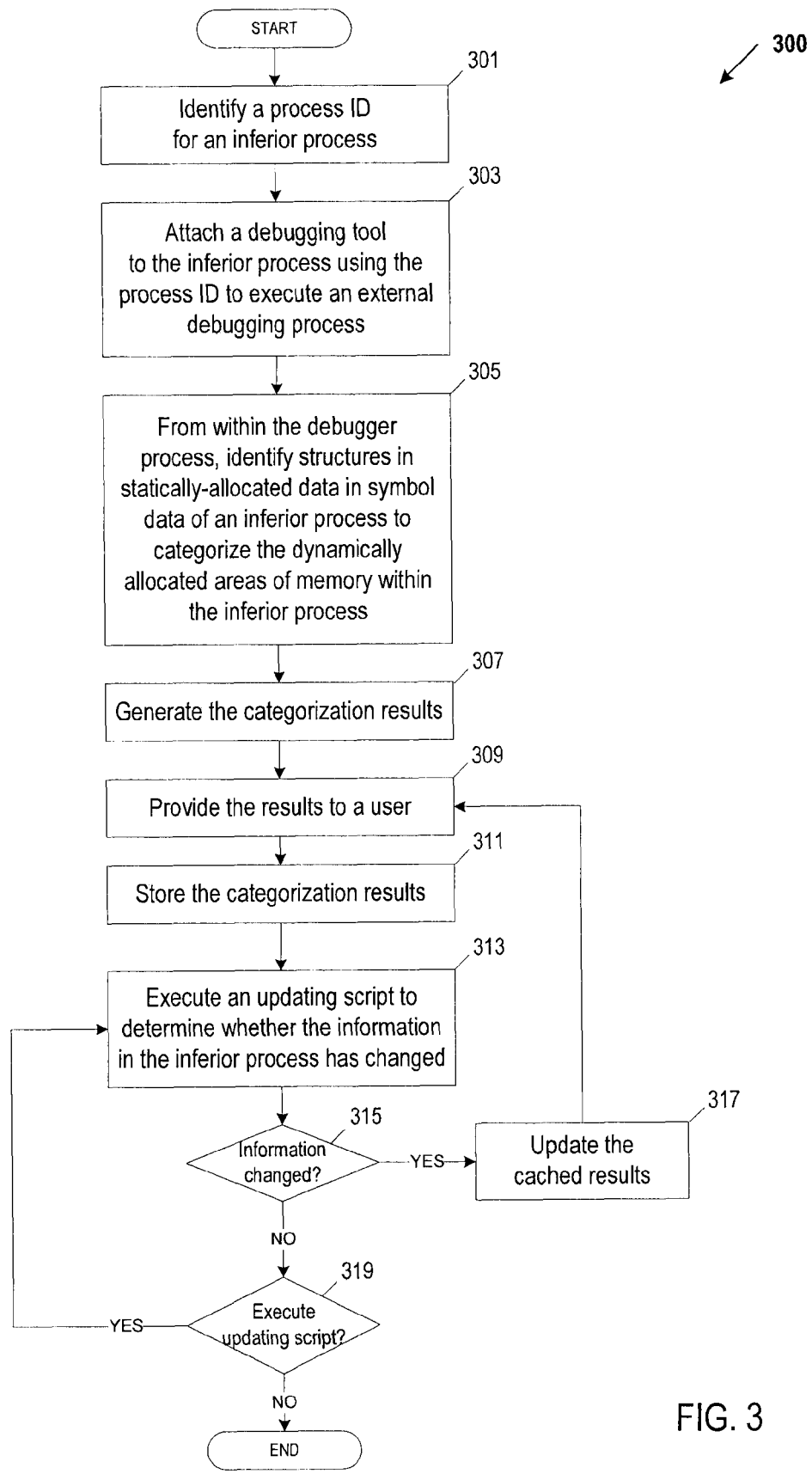
FIG. 3 is a flow diagram of an embodiment of a method for debugging a dynamic memory allocation using structures and/or pointers to structures in statically-allocated data.

FIG. 3 is a flow diagram of an embodiment of a method 300 for debugging a dynamic memory allocation using structures and/or pointers to structures in statically-allocated data. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the memory debug module 140 in the programming and debugging system 100 of FIG. 1.

At block 301, the memory debug module identifies the process ID for the inferior process, and uses it to attach the debugging tool to the inferior process, at block 303. The memory debug module executes an external debugger process to debug the dynamically allocated areas of memory within the inferior process memory space. At block 305, the memory debug module, from within the external debugger process, identifies structures and/or pointers to structures in statically-allocated data in symbol data of the inferior process to categorize the dynamically allocated areas of memory within the inferior process. For example, if an inferior process has been dynamically allocated 80 MB of RAM, the memory debug module can identify structures and/or pointers to structures in the statically-allocated data to categorize the 80 MB of RAM. The memory debug module can iterate through the blocks of dynamically allocated areas of memory within the inferior process that are of interest and determine whether any of the addresses of the blocks of dynamically allocated memory matches the address of the structures and/or pointers to structures in the inferior process memory space. Embodiments of categorizing the blocks of dynamically allocated memory using structures and/or pointers to structures in statically-allocated data in symbol data of an inferior process are described in greater detail below in conjunction with FIG. 4 and FIG. 5.

At block 307, the memory debug module categorizes the blocks of dynamically allocated memory based on the addresses of the blocks of dynamically allocated data that match any of the addresses of structures and/or pointers to structures in the statically-allocated data and generates categorization results. Examples of memory categorization results can include, and are not limited to, backtraces that provide data indicating why a dynamic memory allocation occurred, snapshots of the state of the program process dynamic memory, a history of the snapshots, data showing the differences between the states, data that identifies buffer-overflow, a history of iterations, etc. The memory debug module can receive user input identifying which memory categorization results to generate.

At block 309, the memory debug module provides the memory categorization results to the user. The memory categorization results can be provided to a user via an output device, such as a display device, printer, etc. The memory debug module can generate a GUI that includes the memory categorization results and display the GUI to show a user the categorization of the dynamically allocates areas of memory within the inferior process. In one embodiment, the memory debug module displays the GUI in parallel with the inferior process execution. In another embodiment, the memory debug module displays the GUI subsequent to the inferior process execution. One example of memory categorization results is provided as follows:

| Category | Count | Allocated Size |
|---|---|---|
| string data | 1,944 | 94,432 |
| python str | 85 | 52,752 |
| python dict | 164 | 47,600 |
| python type | 1 | 1,824 |
| python tuple | 3 | 1,232 |
| TOTAL | 2,197 | 197,840 |

The above example is an example of a category-by-category report on the dynamically allocated areas of memory within an inferior process. A user can use a category-by-category report to locate which aspects of an inferior process are occupying the bulk of memory, and which aspects of the inferior process may be the best targets for optimization work.

Another example of memory categorization results is provided as follows:

```
0x000000000060a1c0 -> 0x000000000060a28f   208 bytes      string
data |2f 68 6f 6d 65 2f 64 61 76 69 64 2f 63 6f 64 69 6e 67 2f 68
65 61 70 3a 2f 75 73 72 2f 6c 69 62|
|/home/david/coding/heap:/usr/lib|
0x000000000060a290 -> 0x000000000060ae9f       3088 bytes
uncategorized data |00 00 00 00 00 00 00 00 00 00 00 00 00 00 00 00
00 00 00 00 00 00 00 00 00 81 a8 ab 2f 15 0b b1 01
|............../..|
```

The example above is an example of a memory dump report in a hex dump form that shows all of the memory chunks. A memory dump report can provide a user additional clues into how memory is being used by a program process.

At block 311, the memory debug module stores the memory categorization results within the debugger process memory space, or on a backing store, such as disk (e.g. a SQLite database). Whereas, traditional memory debugging solutions store results, such as backtraces, within the memory space for the inferior process itself. In one embodiment, the memory debug module stores the memory categorization results in a cache memory and stores an updating script in a data store for updating the cached results. At block 313, the memory debug module runs an updating script to detect whether information within the inferior process that is attached to the debugging tool has changed. If the information has changed in the inferior process (block 315), the memory debug module updates the cached memory categorization results to reflect the change at block 317, and returns to block 309 to provide the updated results to a user.

At block 319, the memory debug module determines whether to execute the updating script again. The memory debug module can periodically execute the updating script based on user input. If the user input indicates that the updating script is to be executed, the memory debug module returns to block 313 to execute the updating script.

Figure 4:
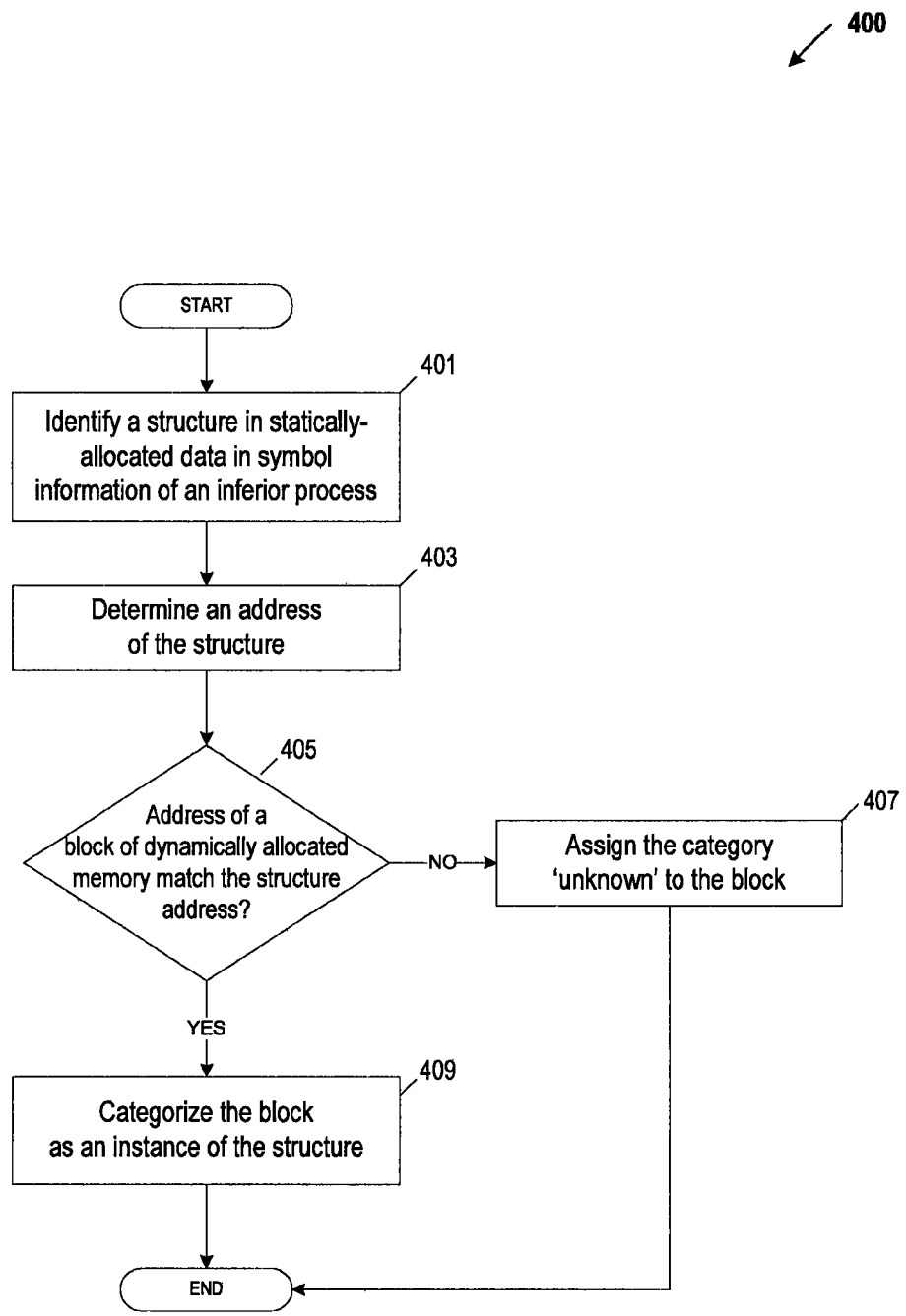
FIG. 4 is a flow diagram of an embodiment of a method for categorizing dynamic memory allocations using structures and/or pointers to structures in statically-allocated data of symbol information for an inferior process.

FIG. 4 is a flow diagram of an embodiment of a method 400 for categorizing dynamic memory allocations using structures and/or pointers to structures in statically-allocated data of symbol information for an inferior process. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the memory debug module 140 in the programming and debugging system 100 of FIG. 1.

At block 401, the memory debug module identifies a structure and/or pointer to structure in statically-allocated data in symbol information of an inferior process. At block 403, the memory debug module determines the address of the structure. One embodiment of determining the address of structures and/or pointers to structures in statically-allocated data of an inferior process is described in greater detail below in conjunction with FIG. 5.

At block 405, the memory debug module determines whether an address of a block of dynamically allocated memory matches an address of the structures and/or pointers to structures. The memory debug module can iterate through the blocks of dynamically allocated areas of memory within the inferior process and determine whether any of the addresses of the blocks of dynamically allocated memory matches that of the structures and/or pointers to structures in the inferior process memory space. If there is not a match, the memory debug module assigns a category, such as 'unknown' or 'uncategorized,' to the block according to one embodiment at block 407. If the address of a block of dynamically allocated memory matches any of the addresses of the structures and/or pointers to structures in the inferior process memory space, the memory debug module categorizes that particular block of dynamically allocated memory as being an instance of the given structure at block 409. For example, the memory debug module determines that the address for struct Foo at 0x32781020 in the inferior process memory space matches that of the particular block of dynamically allocated memory that is currently being examined, and the memory debug module categorizes the particular block of dynamically allocated memory at 0x32781020 as being struct Foo.

The memory debug module can store categorization data, which includes the category for the examined block of dynamically allocated memory. The categorization data can be stored within a debugger process memory space. A results generator (e.g., results generator 220 in FIG. 2) can generate memory categorization results based on the categorization data stored in the data store.

Figure 5:
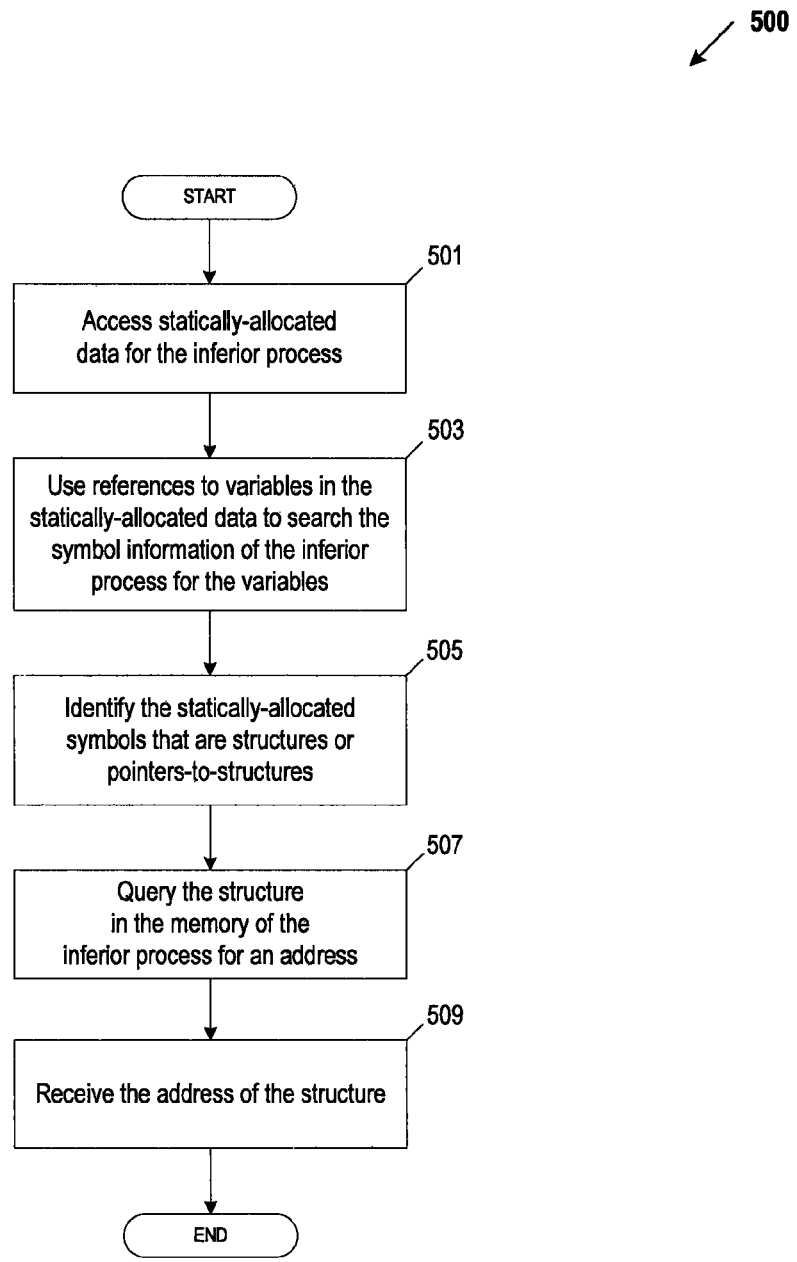
FIG. 5 is a flow diagram of an embodiment of a method for determining an address of a structure.

FIG. 5 is a flow diagram of an embodiment of a method for determining an address of a structure. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the memory debug module 140 in the programming and debugging system 100 of FIG. 1.

At block 501, the memory debug module accesses statically-allocated data for the inferior process. The memory of an inferior process can be organized as a data segment (.data), bss segment (.bss), heap, stack, and code segment. At compile time, when an operating system statically allocates memory for the inferior process, the operating system stores statically-allocated data pertaining to the memory allocated to the inferior process in the .data segment and .bss segment of relocatable program objects, such as dynamic link libraries (dlls). When program objects are linked together into an inferior process, the statically-allocated data within the .data segment and .bss segment reside at fixed addresses relative to the top of those segments within the address space of the inferior process. The memory debug module can use debug metadata to locate the statically-allocated data within the inferior process.

The statically-allocated data includes references to variables, which can be used by the memory debug module as a starting point to categorize the dynamically allocated areas of memory within an inferior process memory space. The .data segment stores initialized statically-allocated variables. For example, a variable declared "int x=1" is contained in the .data segment, at some specific offset from the segment's beginning. The .bss segment stores all statically-allocated variables that can be initialized to zero bits by default. For example, a variable declared "static int i" is contained in the .bss segment, at some specific offset from the segment's beginning.

At block 503, the memory debug module uses the references to variables in the statically-allocated data to search the symbol information of the inferior process for these variables. The memory debug module can be coupled to a data store that stores symbol information within debug data that is generated by a compiler program, which compiled the program software. The symbol information can include symbol tables, which are listings of all of the symbols along with their memory addresses for the various dynamic libraries and binaries that form a program. An example of a symbol table is the '.symtab' section in an executable and linkable file (ELF) program module.

At block 505, the memory debug module locates the statically-allocated variables in the symbol table and examines the 'type' information of the statically-allocated symbols to identify which of the symbols relate to structures and pointers to structures of a program. A symbol table can include an entry for each symbol. An entry can include the symbol name, a value (e.g., memory address) for the symbol, and other information for the symbol, such as a field that provides a classification of the symbol's type. The 'type' information can classify a symbol as having, for example, no type, a function type, a section type, an object type, etc. In one embodiment, the memory debug module examines the 'type' information for the entries for the statically-allocated symbols, locates the symbols having a type that is of the 'object type', and identifies these symbols as relating to structures or pointers to structures. For example, a program may have a database structure 'struct Foo' and a global symbol (e.g., global variable) that is a pointer to the struct Foo. The memory debug module examines the type information for the entries in a symbol table and identifies that one of the symbol entries is an object type and is a pointer to the structure struct Foo. The memory debug module can use other 'type' identifiers (e.g., pointer type) to identify which symbols related to structure or pointers to structures.

At block 507, the memory debug module queries the one or more structures and/or pointers, which are referenced by the variables in the statically-allocated data, in the memory within the inferior process to determine the address of the structure and/or pointer to structure and receives the address at block 509. For example, the memory debug module locates the statically-allocated pointer "struct Foo*ptr_to_foo;" in the memory within the inferior process. A symbol table entry can include a field that provides a memory address for the symbol (e.g. as an offset relative to the start of the .data segment). For example, the memory debug module identifies from the symbol table entries that the ptr_to_foo is located at 0x31600040, and that it is a 4-byte value. The memory debug module can then read that value, such as 0x32781020. The symbol table entry typically identifies where the data is stored relative to a load address of the library. The data may be relocated within memory and a debugging tool can identify the location.

Figure 6:
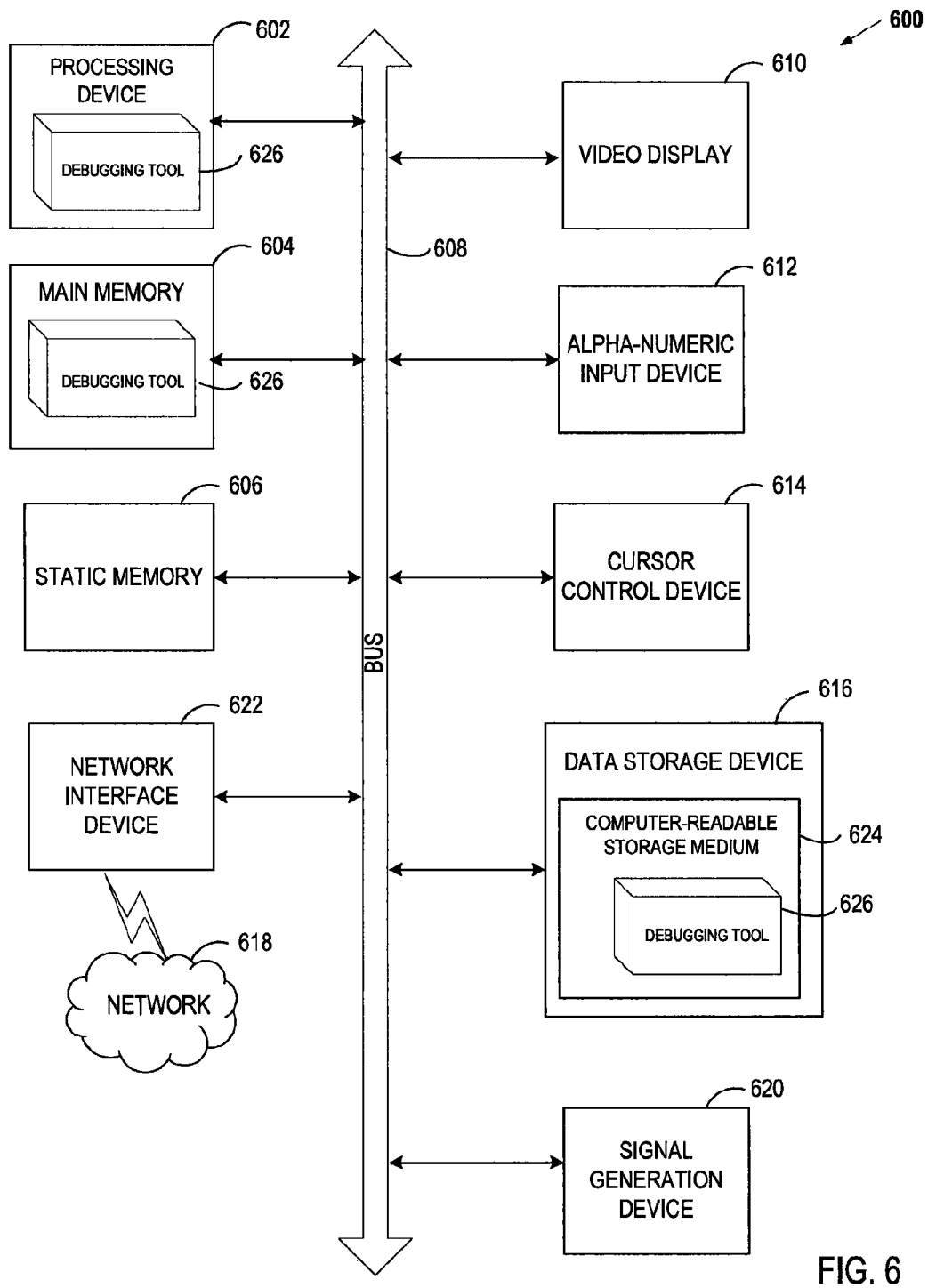
FIG. 6 is a diagram of one embodiment of a computer system for debugging a dynamic memory allocation using structures and/or pointers to structures in statically-allocated data.

FIG. 6 is a diagram of one embodiment of a computer system for debugging a dynamic memory allocation using structures and/or pointers to structures in statically-allocated data. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the debugging tool 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the debugging tool 626) embodying any one or more of the methodologies or functions described herein. The debugging tool 626 may also reside, completely or at least partially, within the main memory 604 and/or within the processing device 602 during execution thereof by the computer system 600, the main memory 604 and the processing device 602 also constituting machine-readable storage media. The debugging tool 626 may further be transmitted or received over a network 618 via the network interface device 622.

The computer-readable storage medium 624 may also be used to store the debugging tool 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The debugging tool 626, components and other features described herein (for example in relation to FIG. 1) can be implemented as discrete hardware components or integrated in the functionality of hardware components such as ASICS, FPGAs, DSPs or similar devices. In addition, the debugging tool 626 can be implemented as firmware or functional circuitry within hardware devices. Further, the debugging tool 626 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying," "locating," "determining," "categorizing,"

"iterating", "casting", "storing," "generating", "displaying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for debugging a dynamic memory allocation using structures and/or pointers to structures in statically-allocated data is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    identifying, by a processing device, one or more statically-allocated symbols in a symbol table for an inferior process, the one or more statically-allocated symbols pertaining to one or more structures for the inferior process, the inferior process having dynamic memory allocations in an inferior process memory space, the symbol table comprising data used to categorize the statically-allocated area of memory;
    locating, the one or more structures in the inferior process memory space;
    determining, whether an address of the one or more structures in the inferior process memory space matches an address of a block of the dynamically allocated area of memory;
    categorizing, by the processing device, the block of dynamically allocated memory based on the determination of whether an address of the one or more structures matches an address of a block of the dynamically allocated area of memory;
    iterating through other blocks of dynamically allocated memory within at least one of the inferior process memory space or a memory space that is layered over the inferior process memory space; and
    categorizing the other blocks of dynamically allocated memory in view of the structure memory addresses for the statically-allocated symbols pertaining to the structures.

2. The method of claim 1, wherein individual statically-allocated symbols of the one or more statically-allocated symbols pertain to a pointer to a structure.

3. The method of claim 1, wherein iterating through the other blocks of dynamically allocated memory comprises iterating through other blocks of dynamically allocated memory within the inferior process memory space based on threshold data stored in memory, wherein the threshold data limits the iterations.

4. The method of claim 1, wherein iterating through the other blocks of dynamically allocated memory comprises iterating through blocks of dynamically allocated memory within a memory space that is layered over the inferior process memory space.

5. The method of claim 1, wherein categorizing the block of dynamically allocated memory comprises:
    determining that an address of the one or more structures pertaining to the statically-allocated symbols matches an address of a block of the dynamically allocated area of memory; and
    categorizing the block as an instance of the structure.

6. The method of claim 1, further comprising:
    casting the categorized block as an instance of a structure;
    determining that the instance of the structure includes a pointer to a second structure;
    locating the second structure in the memory within the inferior process;
    determining whether an address of the second structure matches an address of a block of dynamically allocated memory; and
    categorizing the block of dynamically allocated memory as an instance of the second structure upon determining that the address of the second structure matches an address of a block of dynamically allocated memory.

7. The method of claim 1, further comprising:
    storing categorization data within a debugger process memory space, the categorization data indicating a category for the block of dynamically allocated memory, the debugger process being a process that is separate from the inferior process and having the debugger process memory space that is separate from the inferior process memory space;
    generating memory categorization results for the dynamic memory allocations for the inferior process based on the categorization data to allow a user to optimize performance of the inferior process; and
    displaying the memory categorization results in a graphical user interface (GUI) to show the categorization of the dynamically allocated area of memory of the inferior process.

8. A system comprising:
a persistent storage unit to store a symbol table for an inferior process, the inferior process having dynamic memory allocations, the symbol table comprising data used to categorize the statically-allocated area of memory; and
a processing device coupled to the persistent storage unit to:
identify one or more statically-allocated symbols in the symbol table that pertain to one or more structures for the inferior process;
locate the one or more structures in the inferior process memory space;
determine whether an address of the one or more structures in the inferior process memory space matches an address of a block of the dynamically allocated area of memory;
categorize the block of dynamically allocated memory based on the determination of whether an address of the one or more structures matches an address of a block of the dynamically allocated area of memory;
iterate through other blocks of dynamically allocated memory within at least one of the inferior process memory space or a memory space that is layered over the interior process memory space; and
categorize the other blocks of dynamically allocated memory in view of the structure memory addresses for the statically-allocated symbols pertaining to the structures.

9. The system of claim 8, wherein individual statically-allocated symbols of the one or more statically-allocated symbols pertain to a pointer to a structure.

10. The system of claim 8, wherein the processing device is to iterate through the other blocks of dynamically allocated memory within the inferior process memory space based on the threshold data, wherein the threshold data limits the iterations.

11. The system of claim 8, wherein the processing device is to iterate through blocks of dynamically allocated memory within a memory space that is layered over the inferior process memory space.

12. The system of claim 8, wherein, to categorize the block of dynamically allocated memory, the processing device is to:
determine that an address of the one or more structures pertaining to the statically-allocated symbols matches an address of a block of the dynamically allocated area of memory; and
categorize the block as an instance of the structure.

13. The system of claim 8, wherein the processing device is further to:
cast the categorized block as an instance of the structure;
determine that the instance of the structure includes a pointer to a second structure;
locate the second structure in the memory within the inferior process;
determine whether an address of the second structure matches an address of a block of dynamically allocated memory; and
categorize the block of dynamically allocated memory as an instance of the second structure upon determining that the address of the second structure matches an address of a block of dynamically allocated memory.

14. The system of claim 8, wherein:
the persistent storage unit is further to:
store categorization data within a debugger process memory space, the categorization data indicating a category for the block of dynamically allocated memory, the debugger process being a process that is separate from the inferior process and having the debugger process memory space separate from the inferior process memory space; and
wherein the processing device is further to:
generate memory categorization results for the dynamic memory allocations for the inferior process based on the categorization data to allow a user to optimize performance of the inferior process; and
display the memory categorization results in a graphical user interface (GUI) to show the categorization of the dynamically allocated area of memory of the inferior process.

15. A non-transitory computer-readable medium including instructions that, when executed by a processing device, cause the processing device to perform operations comprising:
identifying one or more statically-allocated symbols in a symbol table for an inferior process, the one or more statically-allocated symbols pertaining to one or more structures for the inferior process, the inferior process having dynamic memory allocations in an inferior process memory space, the symbol table comprising data used to categorize the statically-allocated area of memory;
locating the one or more structures in the inferior process memory space;
determining, by the processing device, whether an address of the one or more structures in the inferior process memory space matches an address of a block of the dynamically allocated area of memory;
categorizing the block of dynamically allocated memory based on the determination of whether an address of the one or more structures matches an address of a block of the dynamically allocated area of memory;
iterating through other blocks of dynamically allocated memory within at least one of the inferior process memory space or a memory space that is layered over the inferior process memory space; and
categorizing the other blocks of dynamically allocated memory in view of the structure memory addresses for the statically-allocated symbols pertaining to the structures.

16. The non-transitory computer-readable medium of claim 15, wherein individual statically-allocated symbols of the one or more statically-allocated symbols pertain to a pointer to a structure.

17. The non-transitory computer-readable storage medium of claim 15, wherein iterating through the other blocks of dynamically allocated memory comprises iterating through other blocks of dynamically allocated memory within the inferior process memory space based on threshold data stored in memory, wherein the threshold data limits the iterations.

18. The non-transitory computer-readable medium of claim 15, wherein iterating through the other blocks of dynamically allocated memory comprises iterating through blocks of dynamically allocated memory within a memory space that is layered over the inferior process memory space.

19. The non-transitory computer-readable medium of claim 15, wherein categorizing the usage of the block of dynamically allocated memory comprises:
determining that an address of the one or more structures pertaining to the statically-allocated symbols matches an address of a block of the dynamically allocated area of memory; and
categorizing the block as an instance of the structure.

20. The non-transitory computer-readable medium of claim 19, the operations further comprising:
- casting the categorized block as an instance of the structure;
- determining that the instance of the structure includes a pointer to a second structure;
- locating the second structure in the memory within the inferior process;
- determining whether an address of the second structure matches an address of a block of dynamically allocated memory; and
- categorizing the block of dynamically allocated memory as an instance of the second structure upon determining that the address of the second structure matches an address of a block of dynamically allocated memory.

* * * * *

UNITED STATES PATENT AND TRADEMARK OFFICE
CERTIFICATE OF CORRECTION

PATENT NO.        : 8,725,978 B2
APPLICATION NO.   : 13/174646
DATED             : May 13, 2014
INVENTOR(S)       : David Hugh Malcolm Page 1 of 1

It is certified that error appears in the above-identified patent and that said Letters Patent is hereby corrected as shown below:

IN THE CLAIMS:

In claim 1, column 13, line 66 delete "locating," and insert --locating--;

In claim 1, column 14, line 1 delete "determining," and insert --determining--.

Signed and Sealed this
Eighteenth Day of November, 2014

Michelle K. Lee
*Deputy Director of the United States Patent and Trademark Office*